United States Patent [19]

Sorkin et al.

[11] Patent Number: 5,072,558
[45] Date of Patent: Dec. 17, 1991

[54] POST-TENSION ANCHOR SYSTEM

[75] Inventors: Felix L. Sorkin, Houston; Norris O. Hayes, Sugar Land, both of Tex.

[73] Assignee: Varitech Industries, Inc., Stafford, Tex.

[21] Appl. No.: 468,574

[22] Filed: Jan. 23, 1990

Related U.S. Application Data

[63] Continuation-in-part of Ser. No. 184,535, Apr. 21, 1988, Pat. No. 4,896,470.

[51] Int. Cl.⁵ .......................... E04C 5/12; E04C 3/26
[52] U.S. Cl. ................................. 52/230; 52/223 L
[58] Field of Search .............. 52/223 L, 223 R, 230

[56] References Cited

U.S. PATENT DOCUMENTS

| | | |
|---|---|---|
| 2,222,755 | 11/1940 | Watson . |
| 2,535,956 | 12/1950 | Roygemsack . |
| 2,857,755 | 10/1958 | Werth . |
| 3,074,112 | 1/1963 | Bobrow . |
| 3,107,983 | 10/1963 | Brondatini . |
| 3,186,679 | 6/1965 | Williams . |
| 3,188,370 | 6/1965 | Gotzy . |
| 3,368,016 | 2/1968 | Birquer . |
| 3,399,434 | 9/1968 | Ketty . |
| 3,470,787 | 10/1969 | Mackie . |
| 3,891,731 | 6/1975 | Williams . |
| 3,991,146 | 11/1976 | Barrie . |
| 4,053,974 | 10/1977 | Howlett et al. . |
| 4,116,439 | 9/1978 | Chevaria et al. . |
| 4,148,856 | 4/1979 | Gress et al. . |
| 4,261,598 | 4/1981 | Cornwall . |
| 4,348,844 | 9/1982 | Schupack et al. . |
| 4,357,293 | 11/1982 | Williamson, Jr. . |
| 4,362,421 | 12/1982 | Kelly . |
| 4,368,607 | 1/1983 | Bonnman . |
| 4,381,908 | 5/1983 | Roth . |
| 4,524,516 | 5/1985 | Wiechard . |
| 4,526,739 | 7/1985 | Migliacci et al. . |
| 4,561,226 | 12/1985 | Tourneur . |
| 4,616,458 | 10/1986 | Davis et al. . |
| 4,719,658 | 1/1988 | Kriofske .................. 52/230 |
| 4,799,307 | 1/1989 | Reigstad et al. .......... 52/230 |
| 4,918,887 | 4/1990 | Davis et al. ............... 52/230 |

FOREIGN PATENT DOCUMENTS

| | | |
|---|---|---|
| 775744 | 5/1957 | United Kingdom . |
| 2169013 | 7/1986 | United Kingdom . |

Primary Examiner—Michael Safavi
Attorney, Agent, or Firm—Harrison & Egbert

[57] ABSTRACT

A tendon tensioning anchor comprising a base member having a tubular section extending therefrom, a plastic encapsulation in surface-to-surface contact with the exterior of the base member, and a heat shield fastened within the plastic encapsulation adjacent an end of a tubular section extending outwardly from the base member. The plastic encapsulation opens at the end of this tubular section opposite the base member. The plastic encapsulation further comprises a tubular portion formed at the side of the base member opposite the tubular section and extends outwardly perpendicular to the base member. The heat shield is a rigid member having an outer diameter corresponding to the outer diameter of the tubular section. The heat shield has an interior surface formed therein for receiving a portion of a sealing cap. The present invention also includes an extension tubing fitted to the end of the tubular portion of the plastic encapsulation. A seal is fastened within the other end of the extension tubing so as to create a liquid-tight seal with a tendon passing therethrough.

21 Claims, 6 Drawing Sheets

POST-TENSION ANCHOR SYSTEM

RELATED APPLICATION

The present application is a continuation-in-part of U.S. application Ser. No. 07/184,535, now U.S. Pat. No. 4,896,470 filed on Apr. 21, 1988, entitled "TENDON TENSIONING ANCHOR", presently pending.

TECHNICAL FIELD

The present invention relates to tendon tensioning anchor assemblies in general. More particularly, the present invention relates to anchor assemblies having surfaces for protecting the anchor from corrosion and exposure. In addition, the present invention relates to systems for receiving and enclosing tendons.

BACKGROUND ART

For many years, the design of concrete structures imitated typical steel design of column, girder and beam. With technological advances in structural concrete, however, its own form began to evolve. Concrete has the advantages of lower cost than steel, of not requiring fireproofing, and of its plasticity, a quality that lends itself to free flowing or boldly massive architectural concepts. On the other hand, structural concrete, though quite capable of carrying almost any compressive (vertical) load, is extremely weak in carrying significant tensile loads. It becomes necessary, therefore, to add steel bars, called reinforcements, to concrete, thus allowing the concrete to carry the compressive forces and the steel to carry the tensile (horizontal) forces.

Structures of reinforced concrete may be constructed with load-bearing walls, but this method does not use the full potentialities of the concrete. The skeleton frame, in which the floors and roofs rest directly on exterior and interior reinforced-concrete columns, has proven to be most economic and popular. Reinforced-concrete framing is seemingly a quite simple form of construction. First, wood or steel forms are constructed in the sizes, positions, and shapes called for by engineering and design requirements. The steel reinforcing is then placed and held in position by wires at its intersections. Devices known as chairs and spacers are used to keep the reinforcing bars apart and raised off the form work. The size an number of the steel bars depends completely upon the imposed loads and the need to transfer these loads evenly throughout the building and down to the foundation. After the reinforcing is set in place, the concrete, a mixture of water, cement, sand, and stone or aggregate, of proportions calculated to produce the required strength, is placed, care being taken to prevent voids or honeycombs.

One of the simplest designs in concrete frames is the beam-and-slab. This system follows ordinary steel design that uses concrete beams that are cast integrally with the floor slabs. The beam-and-slab system is often used in apartment buildings and other structures where the beams are not visually objectionable and can be hidden. The reinforcement is simple and the forms for casting can be utilized over and over for the same shape. The system, therefore, produces an economically viable structure. With the development of flat-slab construction, exposed beams can be eliminated. In this system, reinforcing bars are projected at right angles and in two directions from every column supporting flat slabs spanning twelve or fifteen feet in both directions.

Reinforced concrete reaches its highest potentialities when it is used in pre-stressed or post-tensioned members. Spans as great as 100 feet can be attained in members as deep as three feet for roof loads. The basic principal is simple. In pre-stressing, reinforcing rods of high tensile strength wires are stretched to a certain determined limit and then high-strength concrete is placed around them. When the concrete has set, it holds the steel in a tight grip, preventing slippage or sagging. Post-tensioning follows t he same principal, but the reinforcing is held loosely in place while the concrete is placed around it. The reinforcing is then stretched by hydraulic jacks and securely anchored into place. Pre-stressing is done with individual members in the shop and post-tensioning as part of the structure on the site.

In a typical tendon tensioning anchor assembly in such post-tensioning operations, there is provided a pair of anchors for anchoring the ends of the tendons suspended therebetween. In the course of installing the tendon tensioning anchor assembly in a concrete structure, a hydraulic jack or the like is releasably attached to one of the exposed ends of the tendon for applying a predetermined amount of tension to the tendon. When the desired amount of tension is applied to the tendon, wedges, threaded nuts, or the like, are used to capture the tendon and, as the jack is removed from the tendon, to prevent its relaxation and hold it in its stressed condition.

Metallic components within concrete structures may be come exposed to many corrosive elements, such as de-icing chemicals, sea water, brackish water, or spray from these sources, as well as salt water. If this occurs, and the exposed portions of the anchor suffer corrosion, then the anchor may become weakened due to this corrosion. The deterioration of the anchor can cause the tendons to slip, thereby losing the compressive effects on the structure, or the anchor can fracture. In addition, the large volume of by-products from the corrosive reaction is often sufficient to fracture the surrounding structure. These elements and problems can be sufficient so as to cause a premature failure of the post-tensioning system and a deterioration of the structure.

Several U.S. patents have considered the problem of anchor and tendon corrosion. U.S. Pat. No. 4,348,844, issued to Morris Schupack et al., on Sept. 14, 1982, disclosed a tension assembly in which a tendon is enclosed in a sheath suspended under tension between two spaced anchor members. The anchor members are entirely enclosed within an envelope or a housing. The sheath, the envelope, and the housing are required to comprise electrically non-conductive materials for electrically isolating the tendon and anchor members from a surrounding concrete structure to thereby prevent the effects of electrolysis caused by electrical currents.

After experimentation and study, it has been found that electrolytic actions, described in detail and in the Schupack patent, have little or no deteriorating effect on the anchor assembly. There are occasions in which the electrolytic action created by currents passing through the tendon to the anchor assembly has been found to be beneficial. For instance, when anodic material is placed in electrical connection with such electrically conductive anchor assembly. In this situation, the anodic material adds to the structural strength and stability of the cathodic anchor assembly.

U.S. Pat. No. 4,616,458, issued to Davis on Oct. 14, 1986, provides a plastic structure for protecting the anchor assembly and the ends of a tendon from exposure to the corrosive elements. The system of this patent describes a protective top member and a protective bottom member. The anchor was interposed between these members, the members were snap-fitted together, and the anchor locked into position between these protective members. Grease was then injected into the interior between these protective plastic members so as to seal the anchor from the corrosive water in the environment. A grease cap would be threaded onto the protective top member so as to allow grease to be injected into the interior space.

In practice, the device of the Davis patent required extensive manipulation of the top and bottom members so as to allow the snap-fit to occur. It also required the difficult manipulation of fitting the anchor within this assembly. Finally, the step of injecting grease into the interior was required following assembly. It was found that many man-hours were consumed in the assembly and manipulation steps. On occasion, assembly procedures allowed grease to leak from the interior between the top and bottom members.

The subject of U.S. patent application Ser. No. 184,535, filed on Apr. 21, 1988, entitled "TENDON TENSIONING ANCHOR", by the present inventor, has been extensively used in practice. After extensive field use, it was found that the plastic portion that extends outwardly, and engages the sealing cap, could deform, distort, or be destroyed where heating techniques were used to cut the end of the tendon extending through the anchor. As a result, it was found that the plastic snap-fit arrangement within the end of the plastic encapsulation was insufficient for field use. Additionally, after extensive field use of the anchor of U.S. patent application Ser. No. 184,535, it was found that it is desirable to seal the exposed portions of the coated tendon from water, or other intruding chemicals. In particular, it was important to seal the unsheathed portions of the coated tendon by techniques other than taping.

It is an object of the present invention to provide a tendon tensioning anchor that effectively seals the anchor from the exterior environment.

It is another object of the present invention to provide a tendon tensioning anchor that maintains the integrity of the sealing cap receiving area during the cutting of the tendon end.

It is a further object of the present invention to provide a tendon tensioning anchor that includes a protective covering which needs no assembly, manipulation, or excessive use of manpower.

It is another object of the present invention to provide a post-tension anchor system that effects a superior seal between the exterior of the anchor (and the exposed tendon) and the exterior environment.

It is still another object of the present invention to provide a post-tension anchor system that includes a superior seal to prevent the intrusion of water to the exposed cable while minimizing assembly efforts.

These and other objects and advantages of the present invention will become apparent from a reading of the attached specification and appended claims.

SUMMARY OF THE INVENTION

The present invention is a tendon tensioning anchor that comprises a base member having a tubular section extending therefrom, a plastic encapsulation in surface-to-surface contact with the exterior of the base member and the exterior of the tubular section, and a heat shield fastened to the plastic encapsulation adjacent an end of the tubular section. The tubular section includes a sloping annular interior wall for receiving the end of a tendon.

The plastic encapsulation opens at the end of the tubular section opposite the base member. This plastic encapsulation exposes the sloping annular interior wall. The heat shield is positioned within the plastic encapsulation at the opening. A tubular section is formed at the side of the base member opposite the tubular section and extends outwardly perpendicular to the base member. The base member has a plurality of holes that extend through the thickness of the base member. The plastic encapsulation extends through these holes so as to seal the walls of these holes from the external environment. Specifically, the plastic encapsulation is an injection-molded plastic extending, around the base member, the tubular section, and the heat shield. This plastic encapsulation is in airtight juxtaposition with the exterior of the base member.

The heat shield comprises a circular member having an outer diameter corresponding to the outer diameter of the tubular section of the base member. This heat shield is positioned for the attachment of a sealing cap thereto. Specifically, the heat shield is comprised of metal heat resistant material. The heat shield may include an interior groove formed therein for receiving the lip of a sealing cap. The sealing cap has a size sufficient to accommodate the end of a tendon extending through the base member. The sealing cap is in engagement with the heat shield so as to seal the interior of the plastic encapsulation. Specifically, the sealing cap has a plurality of fingers in spaced relation extending outwardly therefrom. These plurality of fingers engage the interior groove of the heat shield.

The present invention is also a post-tension anchor system that comprises an anchor, a plastic encapsulation in surface-to-surface contact with the exterior of the anchor, a tubing that extends from the plastic encapsulation, and a seal that is fitted in the end of the tubing. The plastic encapsulation includes a tubular portion that extends outwardly perpendicular from the anchor. An extension tubing is connected to this tubular portion of the plastic encapsulation. The seal causes a liquid-tight seal between the extension tubing and a tendon extending through the extension tubing.

A heat shield is fastened within the plastic encapsulation adjacent an end of the tubular section of the anchor. The extension tubing slidably engages the exterior surface of the tubular portion of this plastic encapsulation. The seal is attached by heat sealing, welding, or other adhesive techniques, at the end of the extension tubing opposite the tubular portion of the plastic encapsulation.

The seal is an important aspect of the present invention. The seal comprises a formed object having a ring-like portion that abuts the end of the extension tubing, a first cylindrical portion that extends from the ring-like portion so as to be in surface-to-surface contact with the interior wall of the extension tubing, and a second cylindrical portion interior of the first cylindrical portion and extending from the ring-like portion. This second cylindrical portion is in a location so as to open for receiving a tendon and maintaining a liquid-tight seal with the tendon. The seal is of an elastomeric material, such as rubber. The first cylindrical portion and second cylindrical portion extend from the ring-like portion in a V-shaped pattern. The ends of each of the first cylindrical portion and the second cylindrical portion, opposite the ring-like portion, are bevelled for ease of attachment.

DETAILED DESCRIPTION OF THE INVENTION

Figure 1:
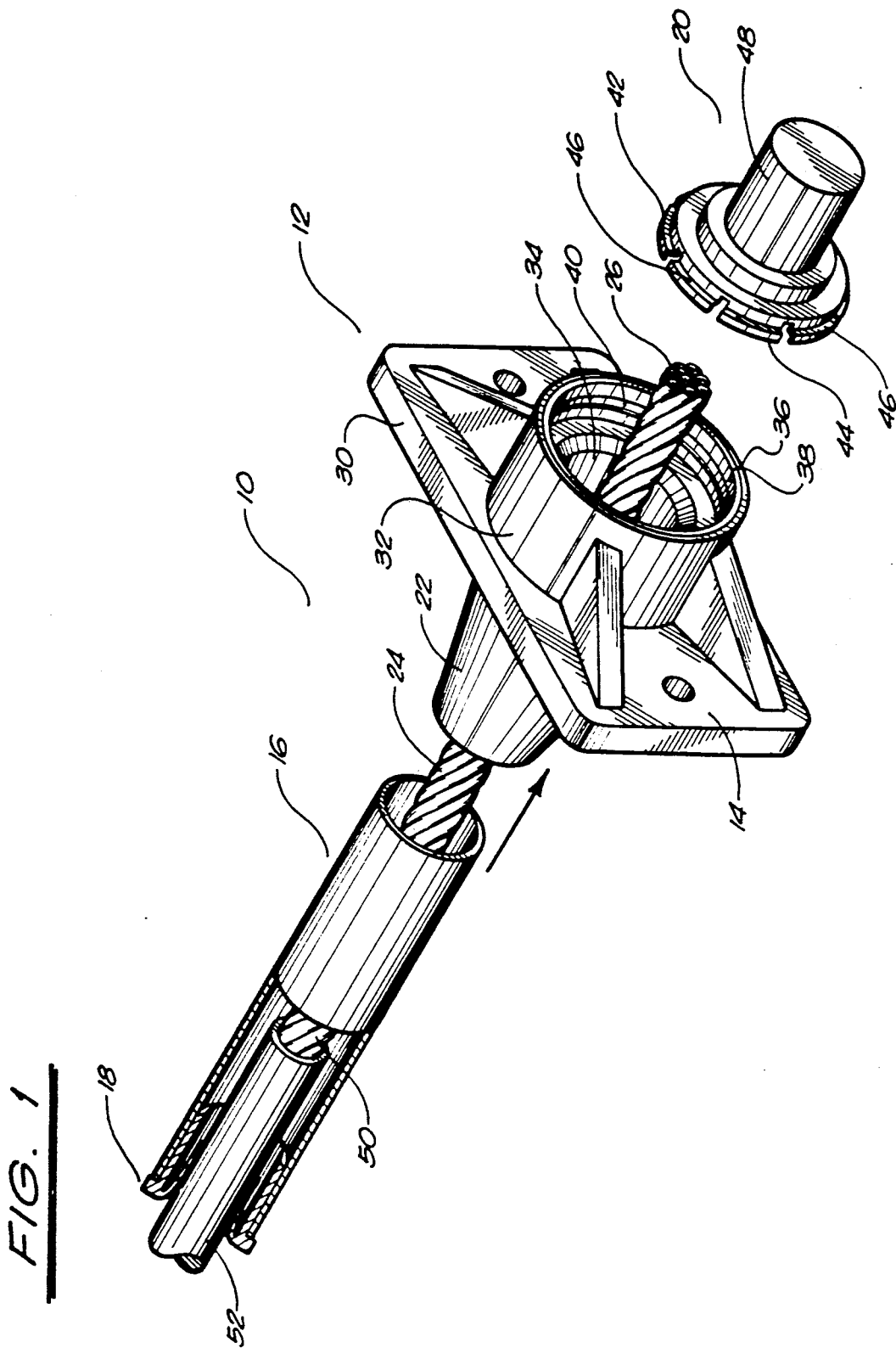
FIG. 1 is an exploded perspective view showing the configuration of the post-tension anchor system of the present invention.

Referring to FIG. 1, there is shown at 10, the post-tension anchor system in accordance with the preferred embodiment of the present invention. Post-tension anchor system 10 comprises anchor 12, plastic encapsulation 14, extension tubing 16, and seal 18. A sealing cap 20 is illustrated in FIG. 1 as showing the relation of the sealing cap 20 with the anchor 12 and plastic encapsulation 14.

As shown in FIG. 1, and described in greater detail hereinafter, the plastic encapsulation 14 is in surface-to-surface contact with the exterior of the anchor 12. Plastic encapsulation 14 includes a tubular portion 22 that extends outwardly perpendicular to anchor 12. The extension tubing 16 is connected to the tubular portion 22 of plastic encapsulation 14 in a sliding relationship, as illustrated by the arrow of FIG. 1. A tendon 24 extends through the extension tubing 16, through the tubular portion 22 of plastic encapsulation 14, and outwardly through the opening in anchor 12. Sealing cap 20 includes an area that accommodates the end 26 of the tendon 24. A seal 18 is fitted into the end of extension tubing 16 opposite the anchor 12. Seal 18 is a specially designed seal for causing a liquid-tight seal between the extension tubing 16 and tendon 24.

The anchor 12 includes a base member 30 having a tubular portion 32 extending therefrom. Tubular section 32 has a sloping annular interior wall 34 for receiving the end 26 of tendon 24. The plastic encapsulation 14 is in surface-to-surface contact with the exterior of the base member 30 and the exterior of the tubular section 32. This plastic encapsulation 14 opens at end 36 opposite base member 30. A heat shield 38 is fastened within plastic encapsulation 14 adjacent the end of the tubular section 32 of anchor 12. The heat shield 38 is of a type for retaining sealing cap 20 therewithin.

The plastic encapsulation 14 is a material that is injection molded around the base member 30, the tubular section 32, and the heat shield 38. In the preferred embodiment of the present invention, the plastic encapsulation is of high-densitiy polyethylene. However, the plastic material used should not be construed as a limitation on the present invention. The plastic encapsulation 14 is in airtight juxtaposition with the exterior of anchor 12.

The heat shield 38 is a circular member having an outer diameter that corresponds with the outer diameter of the tubular section 32. This heat shield is made of a heat resistant material, such as a metal material. The heat shield 38 includes an interior groove 40 for receiving the lip 42 of cap 20. The sealing cap 20 has a size sufficient to accommodate the end 26 of tendon 24. The sealing cap 20 is suitable for engagement within the interior groove 40 of heat shield 38. Ideally, the sealing cap 20 will seal the interior of plastic encapsulation 14. It can be seen, in the preferred embodiment of the present invention, that the sealing cap 20 includes a plurality of fingers 44 in spaced relationship that extend outwardly at lip 42. These plurality of fingers are compressible so as to allow engagement with the interior groove 40 of heat shield 38. Each of these fingers 44 includes a stiffening bar 46 which adds to the structural integrity of each of the individual fingers. By causing a compressive force to be exerted on the extending cylindrical portion 48 of cap 20, the fingers 44 will compress so as to pass into the interior groove 40 of heat shield 38. The forces exerted by these fingers 44 into the groove 40 will prevent the release and maintain the engagement of cap 20 within this groove.

The extension tubing 16 slidably engages the exterior surface of the tubular portion 22 of plastic encapsulation 14. The seal 18 is attached to the extension tubing 16 at the end of the extension tubing opposite the tubular portion 22 of plastic encapsulation 14. The extension tubing 16 is typically made of a polyethylene material. However, this material should not be construed as a limitation on the present invention. Extension tubing 16 should have a length suitable for extending over the area of the unsheathed portion 50 of tendon 24. The seal 18 will create a liquid-tight seal between the extension tubing 16 and the sheathed portion 52 of tendon 24. The unsheathing of tendon 24 will occur prior to the operation of creating tension by pulling the tendon 24 through the opening 34 of anchor 12. The seal 18 effectively prevents water from intruding into the area of the unsheathed portion 50 of tendon 24. As a result of the use of the extension tubing 16 and the seal 18, corrosion of the tendon 24 is prevented. Additionally, the installation of the extension tubing 16 with seal 18 is easier, foolproof, and less complicated than standard procedures existing today.

Figure 2:
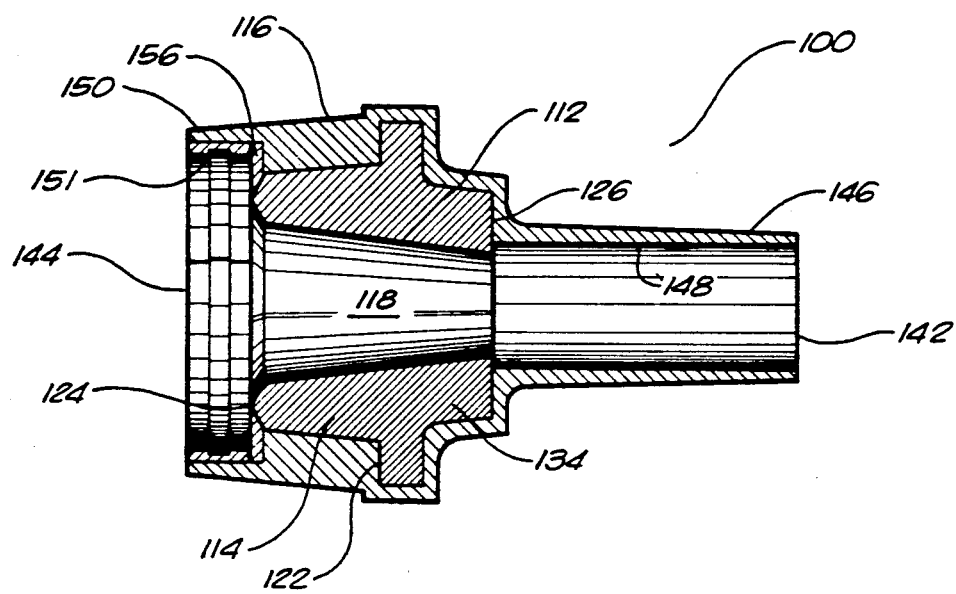
FIG. 2 is an end view of the tendon tensioning anchor of the preferred embodiment of the present invention.

Referring to FIG. 2, there is shown at 100 the tendon tensioning anchor in accordance with the preferred embodiment of the present invention. Tendon tensioning anchor 100 comprises a base member 112 having a tubular section 114 extending therefrom and a plastic encapsulation 116 in generally airtight juxtaposition with the exterior surface of the base member 112 and the tubular section 114. Tubular section 114 has a sloping annular interior wall 118 for receiving the end of a tendon and for receiving the wedges for fixing the position of the tendon.

As shown in FIG. 2, the base member 112 is a relatively standard anchor used for the tensioning of tendons in post-tension construction. The tubular section 114 extends outwardly from the planar surface 122 of base member 112. Tubular section 114 has an outer end face 124. The sloping annular interior wall 118 is a rather large opening that has its widest diameter at end surface 124. The sloping interior wall 118 has a constant taper through the anchor 112 to the other side end face 126.

A transition structure 134 is formed on the side of the base member 112 opposite the tubular section 114. This transition structure 134 tapers from base member 112 toward the end surface 126. This transition structure 134 has a narrowing interior bore that is concentric with the interior wall of base member 112 and the tubular section 114. It should be noted that such transition structure 134 may be present or may not be present in typical anchor assemblies. This should not be construed as a limitation on the present invention.

It can be seen in FIG. 2 that a plastic encapsulation 116 is juxtaposed to the exterior of the base member 112, the exterior of the tubular section 114, and the exterior of the transition structure 134. The plastic encapsulation 116 opens at the end 124 of the tubular section 114. The plastic encapsulation 116 opens so as to expose the sloping annular interior wall 118 of the anchor 112. The plastic encapsulation 116 is injection molded so as to generally surround the exterior of anchor 112. The plastic encapsulation 116 is of a unitary construction (a one-piece formed construction). As can be seen, the plastic encapsulation 116 opens at end 142 and at end 144 of the tendon tensioning anchor 100. The opening at 142 permits electrolytic action between a to-be inserted tendon and the anchor 112.

The plastic encapsulation includes a tubular portion 146 formed at the side of base member 112 opposite the tubular section 114 of the anchor. Tubular portion 146 extends outwardly perpendicular to base member 112. The interior diameter 148 of tubular portion 146 should be sufficient so as to allow a tendon to pass therethrough. It can be seen that the inner diameter 148 of this tubular portion 146 of the plastic encapsulation 116 matches and is in close juxtaposition with the narrow diameter of the sloping interior wall 118 of anchor 112. The inner diameter 148 may also have a sufficient diameter to accommodate any sheaths or protective coatings extending around the exterior of any tendon extending therethrough.

A receiving area 150 is formed adjacent the end 124 of the tubular section 114. This receiving area 150 extends outwardly from the end 124. In operation, receiving area 50 acts to receive and fix the heat shield 151 therewithin. In practice, the heat shield 151 is in proper position prior to the molding of the plastic encapsulation 116 about the anchor 112. As such, the receiving area 150 is molded to the shape of the heat shield 151. Specifically the receiving area 150 comprises a cylindrical portion extending outwardly from the exterior surface of the plastic encapsulation 116 surrounding the tubular section 114. An annular lip 156 extends inwardly from the inner wall of plastic encapsulation 116 so as to abut the end of the tubular section 114 of anchor 112.

Figure 3:
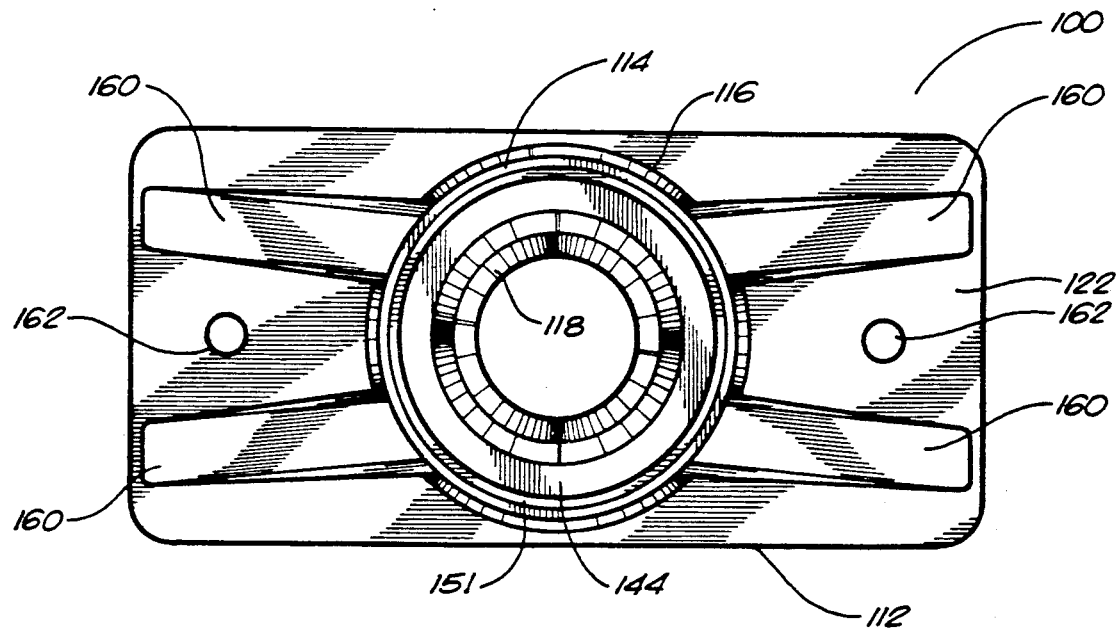
FIG. 3 is a cross-sectional view of the tendon tensioning anchor in accordance with the preferred embodiment of the present invention.

FIG. 3 illustrates the end view of the anchor assembly 100. In FIG. 3, it can be seen that a plurality of reinforcing rib members 160 extend outwardly from the exterior of tubular section 114 to the planar surface 122 of base member 112. These reinforcing rib members 160 add to the structural strength of the anchor 112. These reinforcing rib members 160 extend outwardly radially to the outer edge of the base member 112. It can be seen that the plastic encapsulation 116 surrounds and covers each of the rib members 160.

A pair of holes 162 are formed through the thickness of the base member 112 such that the holes open on each of the planar faces of the base member 112. These holes are for temporarily attaching the anchor to a structure under construction. The plastic encapsulation 116 further includes the sealing of the interior walls of holes 162. It can be seen that holes 162 open through the plastic encapsulation 116 at the planar face 122 of the base member 112. Plastic encapsulation 116 seals the interior wall of these holes so as to prevent corrosive materials from leeching into these holes and thus corroding the anchor 112. Functionally, the holes still operate so as to allow nails, screws, or other fasteners to attach the anchor assembly 100 to an exterior surface. Importantly, however, the metallic walls of the holes are sealed by the plastic encapsulation of the present invention.

The receiving area 144 has a circular configuration. The heat shield 151 is fitted within the receiving area 144 of the plastic encapsulation 116. The tapered inner walls 118 of the anchor 112 is shown by the cross-hatching of FIG. 3. The taper extends downwardly to the opening 142 at the other end of the anchor 100.

Figure 4:
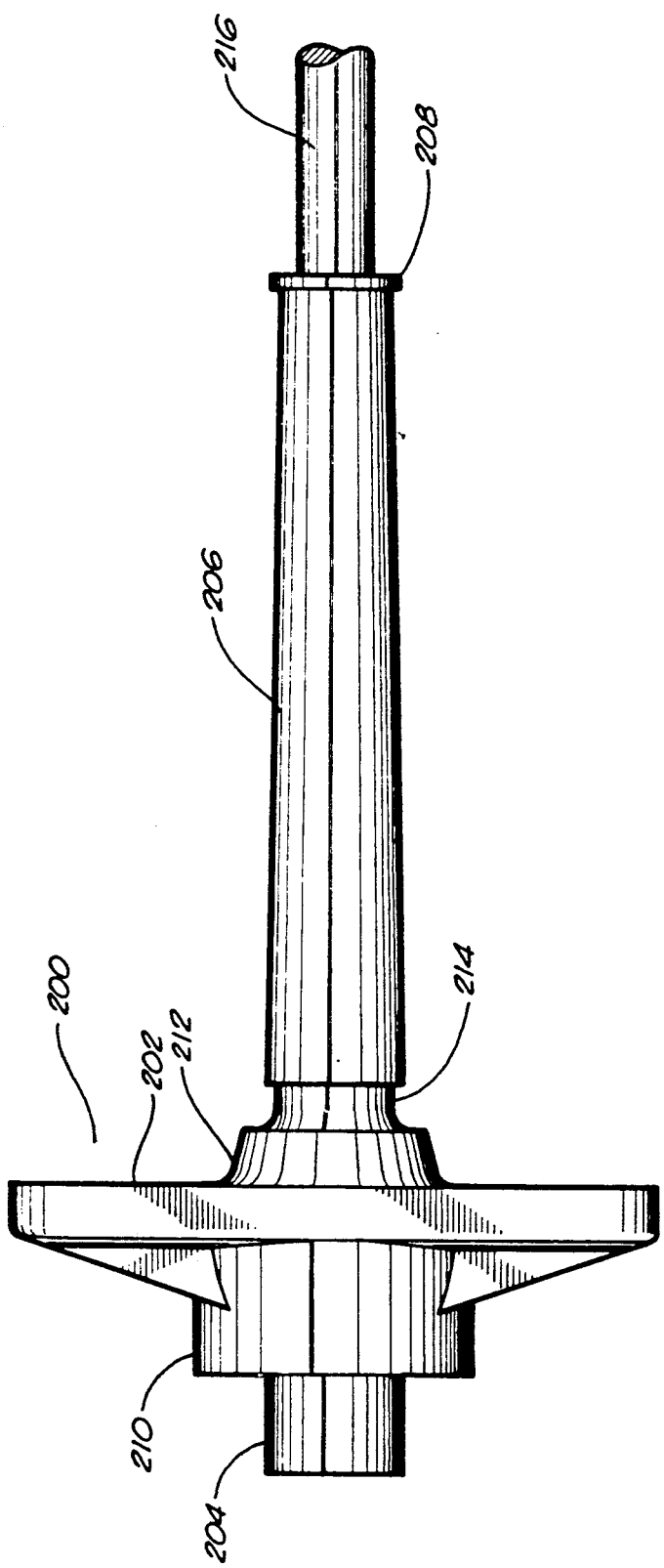
FIG. 4 is a side view of the assembled post-tension anchor system in accordance with the preferred embodiment of the present invention.

FIG. 4 shows the assembled post-tension anchor system 200 of the present invention. The assembled post-tension anchor system 200 of the present invention includes the plastic encapsulated anchor 202, the sealing cap 204, the extension tubing 206, and the seal 208. Specifically, the sealing cap 204 is received by the interior groove of the heat shield fitted within the tubular section 210 of plastic encapsulated anchor 202. The transition structure 212 of plastic encapsulated anchor 202 extends downwardly to the tubular portion 214 at the opposite side of the anchor 202 from the sealing cap 204. The extension tubing 206 slides over the exterior surface of the tubular portion 214 so as to effect a seal therebetween. The extension tubing 206 extends for a desired length over the unsheathed portion of tendon 216. Tendon 216 extends outwardly from the other end of extension tubing 206 opposite the tubular portion 214 of plastic encapsulated anchor 202. Seal 208 is fitted into this end of extension tubing 206 so as to effect a liquid-tight seal between the exterior surface of the tendon 216 (usually a sheathed or other coating) and the extension tubing 206. As such, in the configuration of the assembled post-tension anchor system 200 of the present invention, water, chemicals, or other liquids, cannot intrude so as to cause corrosion of the tendon 216 or the anchor 202.

Figure 5:
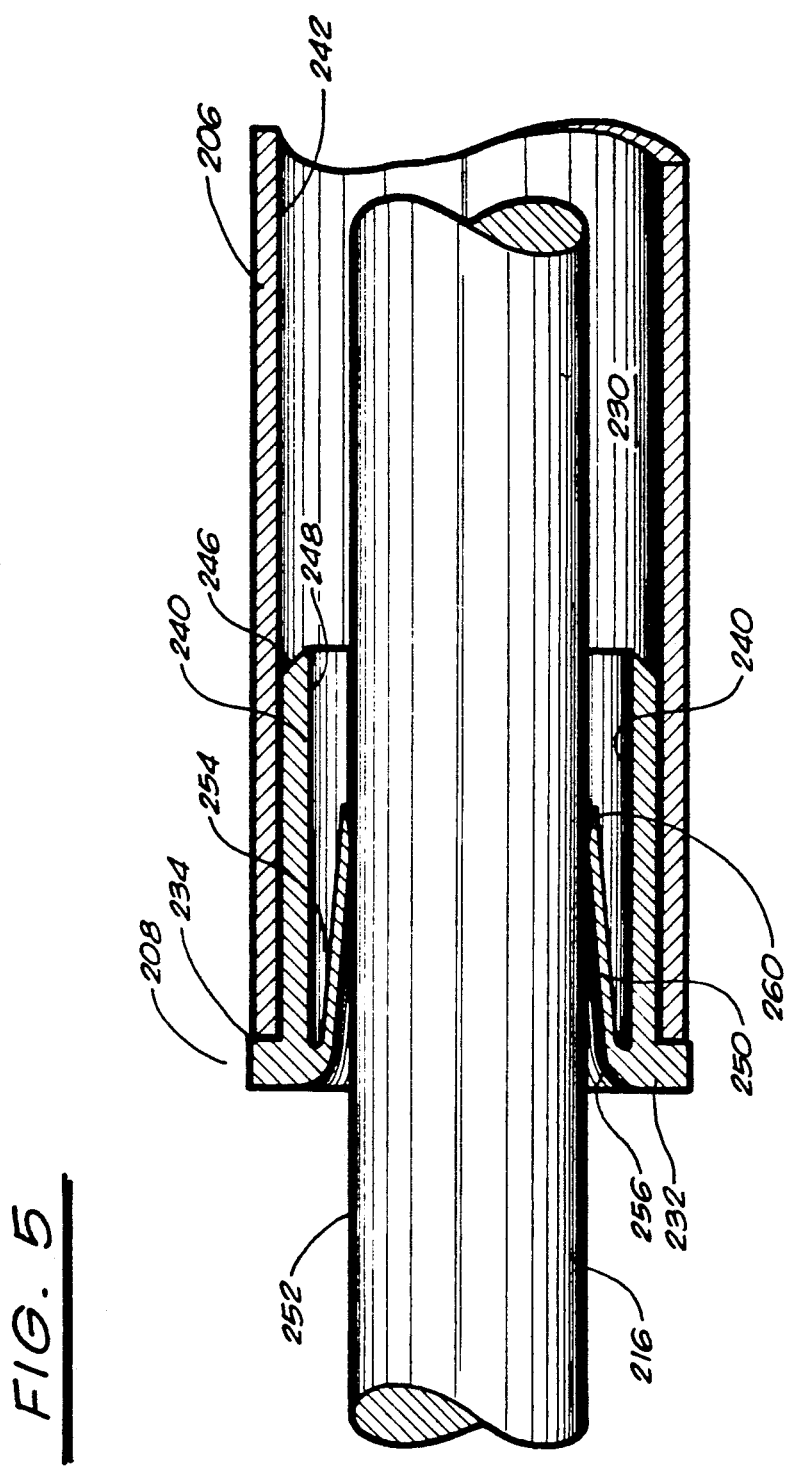
FIG. 5 is a cross-sectional view showing the configuration of extension tubing, seal, and extending tendon.

FIG. 5 shows the specifics of the relationship between the sheathed tendon 216, seal 208 and extension tubing 206. By creating a special seal 208, water intrusion is prevented from passing into the interior 230 of extension tubing 206. Seal 208 includes a ring-like portion 232 that has a surface 234 that abuts the end of the extension tubing 206. A first cylindrical portion 240 extends outwardly from the ring-like portion 232 of seal 208. This first cylindrical portion 240 is in surface-to-surface contact with the interior wall 242 of extension tubing 206 At the end of the first cylindrical portion 240 opposite the ring-like portion 234 is a bevelled area 246. It can be seen that bevelled portion 246 has its greatest length adjacent the inner surface 248 of first cylindrical portion 240. First cylindrical portion 240 has its narrowest length adjacent the interior wall 242 of extension tubing 206. Bevelled portion 246 of the first cylindrical portion 240 is configured so as to allow ease of entry of the seal 208 into the interior of extension tubing 206. A second cylindrical portion 250 is formed interior of the first cylindrical portion 240 and extends outwardly from the ring-like portion 232 of seal 208. The second cylindrical portion 250 angles inwardly somewhat so as to engage the outer wall 252 of the tendon 216. Specifically, there is a V-shaped pattern 254 between the first cylindrical portion 240 and the second cylindrical portion 250. A curved area 256 is formed at the intersection of the ring-like portion 232 and the second cylindrical portion 250. This curved surface 256 will act as a guide so as to allow the tendon 216 to be easily inserted into the interior of the seal 208 and the interior of the extension tubing 206. The second cylindrical portion 250 also includes a bevelled end 260. Bevelled end 260 has its longest portion adjacent the outer diameter of the second cylindrical portion 250. The narrowest end of the bevelled end 260 of second cylindrical portion 250 is adjacent the interior diameter of the second cylindrical portion 250. This bevelled portion 260 enhances the ability to guide the tendon 216 through the seal 208.

The seal 208 is made of an elastomeric material, such as rubber. The seal 208 may be manually or automatically installed within extension tubing 206. The first cylindrical portion 240 may be heat sealed, or adhesively fastened, to the interior wall 242 of extension tubing 206.

Figure 6A:
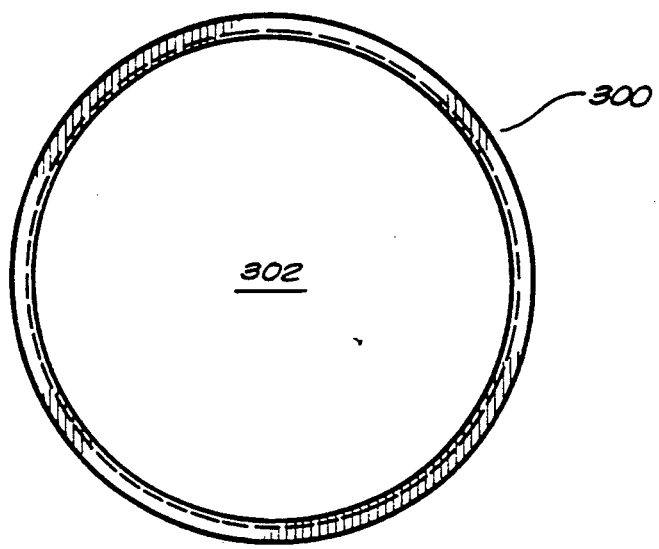
FIG. 6A is a top view of the heat shield of the present invention.
Figure 6B:
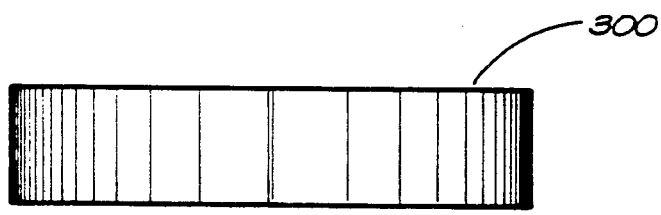
FIG. 6B is a view, in side elevation, of the heat shield of the present invention.
Figure 6C:
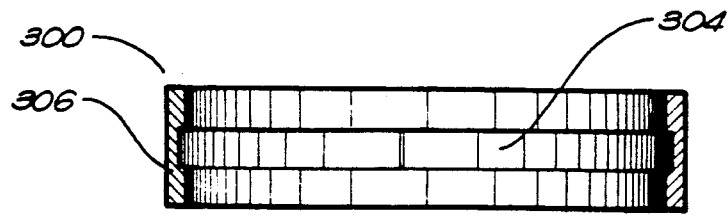
FIG. 6C is a cross-sectional view, in side elevation, of the heat shield of the present invention.

FIGS. 6A-C illustrate the heat shield 300 of the present invention. Heat shield 300 is installed at the end of the anchor adjacent the tubular section of the anchor. In FIG. 6A it can be seen that the heat shield 300 is a circular member of rigid material. Opening 302 in heat shield 300 acts to receive the sealing cap. In FIG. 6B, the heat shield 300 is shown as having an appropriate thickness for structural integrity and for the inclusion of a suitably sized internal groove. In FIG. 6C, it can be seen that the interior groove 304 extends throughout the entire interior of the ring 300. Walls 306 should have a suitable thickness so as to provide for structural integrity even in the area of the groove 304. Groove 304 may be formed by machining, molding, or other techniques. The heat shield 300 is preferably made of a metal or other rigid material. The ultimate requirement of the heat shield 300 is that it have suitable structural stability so as to maintain the sealing cap in proper position. The heat shield 300 protects the plastic encapsulation against distortion, deformation, or destruction when the tendon is cut at the end of the anchor. After experimentation, it was found that plastic threads, or snap fits, within the interior of the tubular section of plastic encapsulation will tend to deform in the presence of great heat. It was also found that great heat was often used to cut the tendons following tensioning. As such, heat shield 300 was included so as to prevent deformation and to maintain structural integrity of the plastic encapsulated anchor. The configuration of the interior groove of the heat shield and the fingers of the sealing cap create a non-removable, permanent sealing cap over the exposed tendon at the end of the anchor.

Figure 7B:
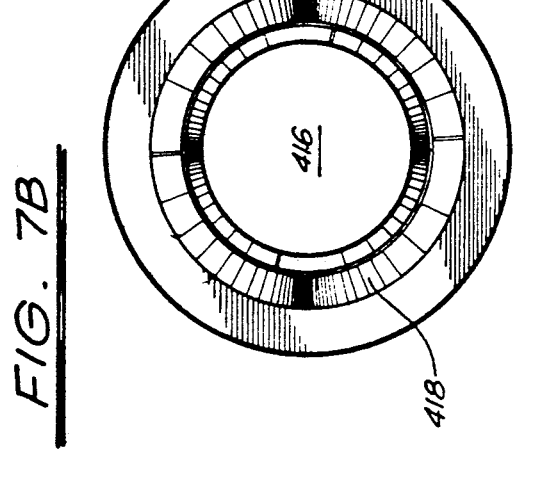
FIG. 7B is a left side end view of the seal of FIG. 7A.
Figure 7A:
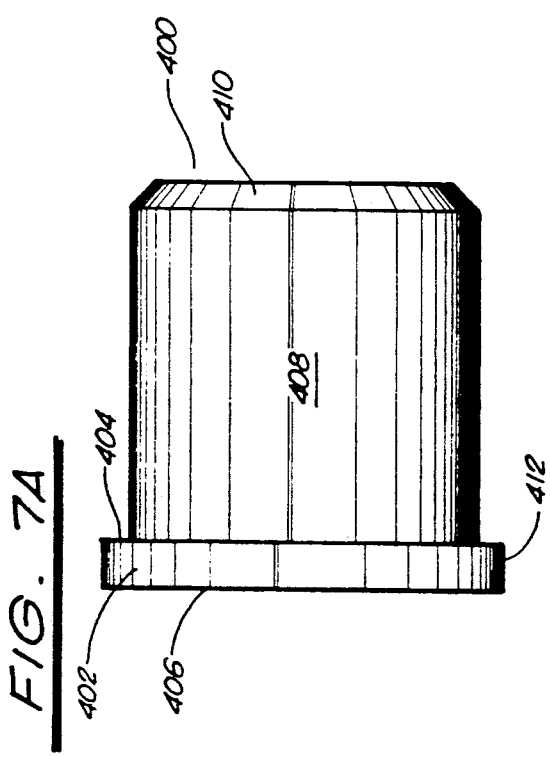
FIG. 7A is a view, in side elevation, of the seal of the present invention.

FIG. 7A is a side view illustrating the seal 400 of the present invention. Seal 400 includes the ring-like surface 402 at one end. An abutment edge 404 occurs on one side of the ring-like portion 402. The other side 406 opens to the end of the system and opens so as to receive a tendon passing therethrough. The first cylindrical portion 408 extends outwardly from side 404 of ring-like portion 402. The bevelled end 410 is formed so as to allow the seal 400 to be easily inserted into the end of the extension tubing. The abutment surface 404 should have an area between the outer edge 412 of the seal 400 and the first cylindrical portion 408 that matches the material thickness of the extension tubing.

FIG. 7B is an end view showing end 406 of seal 400. In FIG. 7B, it can be seen that the opening 416 is of a size sufficient to accommodate the outer diameter of a sheathed tendon. Curved surface 418 is provided so as to act as a guide during the insertion of the tendon into opening 416.

Figure 7D:
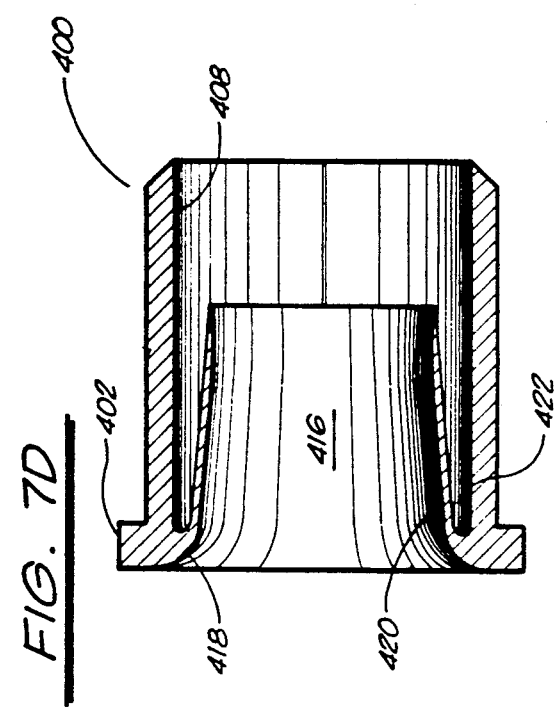
FIG. 7D is a cross-sectional view of the seal in accordance with the present invention.
Figure 7C:
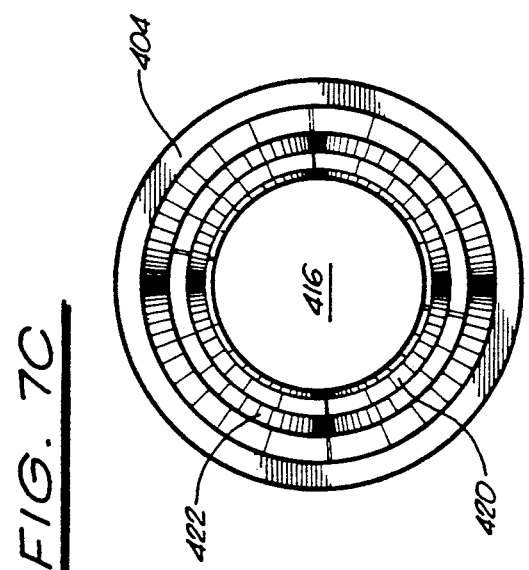
FIG. 7C is a right side end view of the seal of FIG. 7A.

FIG. 7C is an end view adjacent the bevelled end 410 of seal 400. The tendon will extend through opening 416. The V-shaped portion between the first cylindrical portion 408 and the second cylindrical portion 420 is illustrated at 422. The slightly inclined second cylindrical portion 420 acts as the seal to the exterior of the tendon extending therethrough. By slightly angling this second cylindrical portion 420, the second cylindrical portion 420 will adjust to slight variations in the size of the sheathing on the tendon or to deformations on the tendon surface.

FIG. 7D is a cross-sectional view of seal 400 prior to the installation into the extension tubing. As stated previously in connection with FIG. 5, the seal 400 includes the ring-like portion 402, the curved entry 418, and the opening 416. It can be seen that the V-shaped pattern 422 occurs between the first cylindrical portion 408 and the second cylindrical portion 420. As such, the seal 400 acts as an effective seal to the intrusion of water into the interior of the extension tubing.

In normal operation, the plastic encapsulated anchor of the present invention is extremely useful in post-tensioning. During the process of post-tensioning, initially, holes are drilled into the form that retains the concrete. A pocket-former (of standard construction) is inserted into the receiving are of the anchor. The extension tubing and seal are placed over the tubular portion of the plastic encapsulation of the anchor of the present invention. The tendon is then passed through the seal, through the tubular extension, and through the pocket former. The tendon thusly extends through the initial form. The tendon is then stressed to a desired amount so as to apply compression upon the form and the associated concrete. During tensioning, wedges are placed within the sloping walls 118 of the base member 112. After tension is removed from the tendon, the return of the tendon will cause a wedging action which retains tension within the tendon and keeps the tendon from reducing tension. The excess remaining portion of the tendon is then removed by heating, cutting, sawing, or other means. After cooling the sealing cap is then placed over the receiving area of the anchor. Grease, or other corrosion inhibitors, may be inserted into the interior of the sealing cap. The inclusion of such materials further protects the tendon and the anchor from exposure to corrosive elements.

The present invention offers a number of advantages over the prior art. The anchor of the present invention is completely encapsulated in a virtually airtight manner in plastic. This encapsulation has high strength, excellent low temperature properties, and high chemical resistance. Unlike the prior art, the encapsulation is of a single unit. The present invention requires no assembly at the work place.

In manufacture, the present invention offers an anchor that does not require expensive machining, assembly, or manipulation. No grease is required between the anchor and the plastic encapsulation. This eliminates the possibility of air pockets and the necessity of costly assembly.

It is a common problem at the construction site that parts are lost, misplaced, undelivered, and otherwise absent. Many of the prior-art devices serving similar functions require the assembly of several parts. The mere fact of requiring several parts for assembly inherently means the loss of such parts at the job site, the ordering of additional quantities of parts, and difficulties in instruction, use, and organization. The present invention, having a unitary configuration, does not require such additional parts, such as covers, or other components. The present invention achieves a savings in manpower and expense by offering this unitary configuration.

In prior art techniques, in order to seal the unsheathed portion of the tendon, complicated procedures (e.g., the wrapping of the unsheathed portion with tape) were required. Taping is a laborious procedure requiring skill and attention. In the typical work place, such skill and attention are not devoted to the process of wrapping the sealing tape around the exposed portions of the tendon. As such, in prior art techniques, the intrusion of water, and other corrosives, has caused the destruction of the tendon. The present invention, on the other hand, offers an alternative to tape and wrapping. In order to install the extension tube and the seal of the present invention, very little labor or complex manipulation is required. In fact, where the seal is installed into the extension tubing prior to the delivery to the work place, the step of installing the seal into the extension tubing is eliminated. As such, the present invention offers the construction industry a foolproof method of sealing the unsheathed tendon from water intrusion.

Further and additional benefits are gained by the fact that electrolysis will be allowed to occur, naturally, between the tendon and the anchor. It is believed that the electrolytic effects do not create any additional corrosion in the anchor or in the tendon. It is believed that it is possible that the electrolytic effects may further enhance and strengthen attachment forces between the tendon and the anchor, especially where cathodic action occurs.

Since the exterior Of the anchor assembly of the present invention is completely sealed, there is no possibility of accidental infiltration by corrosive elements. The plastic encapsulation is of high strength so that it becomes very difficult to invade the protective environment of the encapsulation. It is believed that the encapsulation of the present invention will give the anchor, and associated tendon, a much longer life than prior art systems.

The foregoing disclosure and description of the invention is illustrative and explanatory thereof, and various changes in the details of the illustrated apparatus, may be made within the scope of the appended claims, without departing from the true spirit of the invention. The present invention should only be limited by the following claims and their legal equivalents.

We claim:

1. A tendon tensioning anchor comprising:
   a base member having a tubular section extending therefrom, said tubular section having a sloping annular interior wall for receiving an end of a tendon;
   a polymeric encapsulation in surface-to-surface contact with an exterior surface of said base member and an exterior surface of said tubular section, said polymeric encapsulation having a receiving area extending outwardly beyond an end of said tubular section; and
   a heat shield embedded within said polymeric encapsulation adjacent an end of said tubular section, said heat shield being an annular member of a material having greater heat resistance than said polymeric encapsulation.

2. The anchor of claim 1, said polymeric encapsulation opening at the end of said tubular section opposite said base member, said polymeric encapsulation exposing said sloping annular interior wall, said heat shield positioned within said polymeric encapsulation at said opening, said heat shield exposing said sloping annular interior wall.

3. The anchor of claim 1, said polymeric encapsulation further comprising:
   a tubular portion formed at the side of said base member opposite said tubular section and extending outwardly perpendicular to said base member.

4. The anchor of claim 1, said base member having a plurality of holes extending through the thickness of said base member, said polymeric encapsulation extending through said plurality of holes so as to seal the walls of said holes from the external environment.

5. A tendon tensioning anchor comprising:
   a base member having a tubular section extending therefrom, said tubular section having a sloping annular interior wall for receiving an end of a tendon;
   a polymeric encapsulation in surface-to-surface contact with an exterior surface of said base member and an exterior surface of said tubular section; and
   a heat shield fastened within said polymeric encapsulation adjacent an end of said tubular section, said polymeric encapsulation comprising a material injection-molded directly to said base member, said tubular section, and said heat shield, said polymeric encapsulation being in airtight juxtaposition with the exterior surface of said base member.

6. The anchor of claim 5, further comprising:
   a reinforcing rib member extending outwardly from the exterior of said tubular section to said base member, said polymeric encapsulation surrounding said rib member.

7. The anchor of claim 5, said heat shield comprising:
   a circular member having an outer diameter corresponding to the outer diameter of said tubular section, said heat shield for the attachment of a sealing cap.

8. The anchor of claim 5, said heat shield comprised of a metal material.

9. The anchor of claim 5, said heat shield comprising a rigid member having an interior receiving area formed therein, said interior receiving area for receiving a portion of a sealing cap.

10. The anchor of claim 9, further comprising:
    a sealing cap having a size sufficient to accommodate the end of a tendon, said sealing cap being in engagement with said interior receiving area of said heat shield.

11. The anchor of claim 10, said sealing cap having an outwardly projecting surface, said outwardly projecting surface for engaging said interior receiving area of said heat shield.

12. A post-tension anchor system comprising:
an anchor;
a polymeric encapsulation in surface-to-surface contact with an exterior of said anchor, said polymeric encapsulation having a tubular member extending perpendicularly outwardly from said anchor, said polymeric encapsulation comprising a material injection-molded directly to said anchor, said polymeric encapsulation in airtight juxtaposition with the exterior of said anchor; and
a seal fitted to an end of said tubular member, said seal for receiving a tendon extending through said tubular member in liquid-tight relationship.

13. The system of claim 12, said anchor comprising:
a base member having a tubular section extending therefrom, said tubular section having a sloping annular interior wall for receiving the end of a tendon.

14. The system of claim 13, said polymeric encapsulation in surface-to-surface contact with the exterior of said base member and the exterior of said tubular section, said polymeric encapsulation opening at the end of said tubular section opposite said base member.

15. The system of claim 13, further comprising:
a heat shield fastened within said polymeric encapsulation adjacent an end of said tubular section, said heat shield for retaining a sealing cap therewithin, said heat shield comprised of a material having greater heat resistance than said polymeric encapsulation.

16. The system of claim 15, said polymeric encapsulation comprising a material molded directly to said base member, said tubular section, and said heat shield.

17. The system of claim 15, said heat shield comprising:
a member having an outer diameter corresponding to the outer diameter of said tubular section, said heat shield being of a heat-resistant metal, said heat shield having an interior surface for receiving a portion of a sealing cap.

18. A post-tension anchor system comprising:
an anchor;
a polymeric encapsulation in surface-to-surface contact with an exterior of said anchor, said polymeric encapsulation having a tubular member extending perpendicularly outwardly from said anchor; and
a seal fitted to the end of said tubular member, said seal for causing a liquid-tight seal with a tendon extending through said tubular member, said tubular member comprising an extension tubing slidably engaging the exterior surface of a tubular portion of said polymeric encapsulation, said seal attached to the end of said extension tubing opposite said tubular portion of said polymeric encapsulation, said seal comprising:
a ring-like portion abutting the end of said extension tubing;
a first cylindrical portion extending outwardly from said ring-like portion, said first cylindrical portion in surface-to-surface contact with the interior wall of said extension tubing; and
a second cylindrical portion interior of said first cylindrical portion, said second cylindrical portion extending from said ring-like portion, said second cylindrical portion opening so as to receive a tendon.

19. The system of claim 18, said seal being of an elastomeric material, said first cylindrical portion being heat sealed to the interior wall of said extension tubing.

20. The system of claim 18, said first cylindrical portion and said second cylindrical portion extending from said ring-like portion in a V-shaped patter.

21. The system of claim 18, each of the ends of said first cylindrical portion and said second cylindrical portion opposite said ring-like portion being bevelled.

* * * * *